United States Patent
Akhoundi

(10) Patent No.: US 12,079,913 B2
(45) Date of Patent: Sep. 3, 2024

(54) ANIMATION GENERATION AND INTERPOLATION WITH RNN-BASED VARIATIONAL AUTOENCODERS

(71) Applicant: Electronic Arts Inc., Redwood City, CA (US)

(72) Inventor: Elaheh Akhoundi, Vancouver (CA)

(73) Assignee: ELECTRONIC ARTS INC., Redwood City, CA (US)

( * ) Notice: Subject to any disclaimer, the term of this patent is extended or adjusted under 35 U.S.C. 154(b) by 209 days.

(21) Appl. No.: 17/710,253

(22) Filed: Mar. 31, 2022

(65) Prior Publication Data

US 2023/0316616 A1 Oct. 5, 2023

(51) Int. Cl.
*G06T 13/40* (2011.01)
*G06N 3/045* (2023.01)

(52) U.S. Cl.
CPC ............. *G06T 13/40* (2013.01); *G06N 3/045* (2023.01)

(58) Field of Classification Search
CPC ........ G06N 3/0442; G06N 3/045; G06N 3/09; G06N 3/0455; G06N 3/047; G06N 20/00; G06N 3/044; G06T 13/40; G06T 2207/10016; G06T 2207/20081; G06V 40/23; G06V 20/41; G06V 20/46
See application file for complete search history.

(56) References Cited

U.S. PATENT DOCUMENTS

| | | | | |
|---|---|---|---|---|
| 2018/0174576 A1* | 6/2018 | Soltau | ...................... | G10L 15/02 |
| 2020/0372352 A1* | 11/2020 | Deng | ...................... | G06N 3/045 |
| 2023/0037339 A1* | 2/2023 | Villegas | .................... | G06N 3/08 |
| 2023/0223018 A1* | 7/2023 | Xing | ........................ | G10L 15/22 |
| | | | | 704/232 |

OTHER PUBLICATIONS

Bowman, Samuel R.et al., Generating Sentences from a Continuous Space, SIGNLL Conference on Computational Natural Language Learning (CONLL), arXiv:1511.06349v4, 12 pages, dated May 12, 2016.
Karpathy, Andrej et al., Generative Models, Open AI, Retrieved from: https://openai.com/blog/generative-models/, 14 pages, dated Jun. 16, 2016.
Rocca, Joseph, Understanding Variational Autoencoders (VAEs), Towards Data Science, Retrieved from: https://towardsdatascience.com/understanding-variational-autoencoders-vaes-f70510919f73, 25 pages, dated Sep. 23, 2019.

* cited by examiner

*Primary Examiner* — Xilin Guo
(74) *Attorney, Agent, or Firm* — Gray Ice Higdon

(57) ABSTRACT

This specification relates to the generation of animation data using recurrent neural networks. According to a first aspect of this specification, there is described a computer implemented method comprising: sampling an initial hidden state of a recurrent neural network (RNN) from a distribution; generating, using the RNN, a sequence of frames of animation from the initial state of the RNN and an initial set of animation data comprising a known initial frame of animation, the generating comprising, for each generated frame of animation in the sequence of frames of animation: inputting, into the RNN, a respective set of animation data comprising the previous frame of animation data in the sequence of frames of animation; generating, using the RNN and based on a current hidden state of the RNN, the frame of animation data; and updating the hidden state of the RNN based on the input respective set of animation data.

18 Claims, 6 Drawing Sheets

ANIMATION GENERATION AND INTERPOLATION WITH RNN-BASED VARIATIONAL AUTOENCODERS

FIELD

This specification relates to the generation of animation data using recurrent neural networks.

BACKGROUND

Two general methods for animating game characters are: motion capture of live performers and keyframed animation created by animators. Motion capture can create highly realistic character animation. Nonetheless, it is often limited to what can be performed by a live human. On the other hand, a skilled animator can create complex animation by manually keyframing the specific motions of the character, defining the starting and ending points of a smooth transition. Animation software will then interpolate the frames between the keyframes, filling out the entirety of the character movement. The process of creating these intermediate frames is called "inbetweening".

Inbetweening (or sometimes just "tweening") goes back almost to the very beginning of hand-drawn animation. Artists working on animated movies would use a light table to draw a set of pencil and paper drawings of the intermediate steps between keyframes. The keyframes would be drawn by lead animators, who set the style and tone of a scene, leaving the work of filling in the bulk of the animation to dedicated inbetweeners. The work of the inbetweeners creates the illusion of movement by smoothly transitioning one image into another.

A more recent approach is to use computers to interpolate the missing animation frames. However, naïve interpolation results in intermediate animation frames that do not accurately reflect real world movement. A typical practical example of this in character animation is when a character's feet do not appear anchored to the ground as they walk. Their feet may appear to slide across the floor. This is often the result of an overly simple interpolation between positions of the character's feet.

SUMMARY

According to a first aspect of this specification, there is described a computer implemented method comprising: sampling an initial hidden state of a recurrent neural network (RNN) from a distribution; generating, using the RNN, a sequence of frames of animation from the initial state of the RNN and an initial set of animation data comprising a known initial frame of animation, the generating comprising, for each generated frame of animation in the sequence of frames of animation: inputting, into the RNN, a respective set of animation data comprising the previous frame of animation data in the sequence of frames of animation; generating, using the RNN and based on a current hidden state of the RNN, the frame of animation data; and updating the hidden state of the RNN based on the input respective set of animation data.

Generating, using the RNN and based on a current state of the RNN, the frame of animation data may comprise: generating, using a first RNN, data representing a set of key points for the animation frame from the input respective set of animation data; and generating, using a second RNN, the frame of animation data from the set of key points.

The data representing the set of key points for the animation may comprise locations and/or orientations of a plurality of joints of a character in the sequence of frames of animation.

The generated sequence of frames of animation may run from the known initial frame of animation to a known final frame of animation. The respective set of animation data for each generated animation frame further may comprise the known final frame of animation and an indication of a temporal distance between the generated frame and the known final frame of animation in the sequence of animation frames. The temporal distance between the generated frame and the known final frame of animation may comprise a number of frames between the generated frame and the known final frame of animation in the sequence of animation frames.

The RNN may comprise a unidirectional long short-term memory layer.

The distribution may be a learned distribution that has been obtained by jointly training the RNN with an encoder RNN using a Variational Autoencoder approach.

According to a further aspect of this specification, there is described a non-transitory computer readable medium comprising computer readable instructions that, when executed by a system comprising one or more processors, causes the system to perform a method comprising: sampling an initial state of a recurrent neural network (RNN) from a distribution; generating, using the RNN, a sequence of frames of animation from the initial state of the RNN and an initial set of animation data comprising a known initial frame of animation, the generating comprising, for each generated frame of animation in the sequence of frames of animation: inputting, into the RNN, a respective set of animation data comprising the previous frame of animation data in the sequence of frames of animation; generating, using the RNN and based on a current state of the RNN, the frame of animation data; and updating the state of the RNN based on the input respective set of animation data.

Generating, using the RNN and based on a current state of the RNN, the frame of animation data may comprise: generating, using a first RNN, data representing a set of key points for the animation frame from the input respective set of animation data; and generating, using a second RNN, the frame of animation data from the set of key points. The data representing the set of key points for the animation may comprise locations and/or orientations of a plurality of joints of a character in the sequence of frames of animation.

The generated sequence of frames of animation may run from the known initial frame of animation to a known final frame of animation. The respective set of animation data for each generated animation frame may further comprise the known final frame of animation and an indication of a temporal distance between the generated frame and the known final frame of animation in the sequence of animation frames. The temporal distance between the generated frame and the known final frame of animation may comprise a number of frames between the generated frame and the known final frame of animation in the sequence of animation frames.

The RNN may comprise a unidirectional long short-term memory layer.

The distribution may be a learned distribution obtained by jointly training the RNN with an encoder RNN using a Variational Autoencoder approach.

According to a further aspect of this specification, there is described a computer implemented method comprising: generating, using an encoder recurrent neural network (RNN), one or more candidate parameters of a latent distribution from a ground truth sequence of frames of animation; sampling, from the latent distribution, an initial hidden state of a decoder RNN; generating, using the decoder RNN, a candidate sequence of frames of animation from the ground truth sequence of frames of animation, comprising, at each of a plurality of iterations: inputting, into the decoder RNN, input data comprising a ground truth frame of animation; generating, based on a current hidden state of the decoder RNN, a candidate next frame of animation from the input data for the iteration; and updating the hidden state of the decoder RNN based on the input data for the iteration and/or the candidate next frame of animation for the iteration; determining a value of an objective function, the objective function comprising: (i) a comparison of the candidate sequence of frames of animation to the ground truth sequence of frames of animation; and (ii) a latent loss measuring a difference between an approximate posterior and a prior distribution; updating parameters of the encoder RNN and/or decoder RNN based on the value of the objective function.

Generating a candidate next frame of animation may comprise: generating, using a first RNN of the decoder RNN, data representative of a respective set of key points for the input frame; and generating, using a second RNN, the respective candidate next frame of animation data from the data representative of the set of key points.

The encoder RNN and/or decoder RNN may comprise a unidirectional long short-term memory layer.

The distribution may comprise a Gaussian distribution. The one or more candidate parameters of the distribution may comprise a mean and a standard deviation.

The latent loss may comprise a Kullback-Leibler divergence.

Updating parameters of the encoder RNN and/or decoder RNN based on the value of the objective function may comprise applying stochastic gradient descent to the objective function.

BRIEF DESCRIPTION OF THE DRAWINGS

Examples and embodiments will be described by way of non-limiting example with reference to the accompanying set of drawings, in which.

DETAILED DESCRIPTION

This specification describes systems and methods for generating a sequence of animation frames from one or more initial animation frames, e.g. a couple of animation frames, and, in some embodiments, a final, target animation frame. The systems and methods described herein utilize recurrent neural network (RNN) based Variational Autoencoders (VAEs) for learning representations of character motion that can be used for generating smooth and realistic looking motion by machine and without human intervention. In some implementations, the systems and methods are applied to pose-to-pose interpolation, or motion inbetweening, i.e., generating a sequence of poses to smoothly transition between a given set of start and end poses. In some implementations, a sequence of animation frames can be generated from one or more initial input frame without having a specific end frame.

A Variational Autoencoder (VAE) is a generative model, which not only learns a low-dimensional representation of data it also learns a probabilistic model for the data. As a consequence, once the distribution is learned by a VAE, it can be used to generate new samples from that distribution and generate new data. For instance, one can train a VAE on a dataset of faces and later use the model to generate new faces that look realistic. There are two main differences between VAEs and the conventional autoencoders.

Firstly, instead of learning a deterministic latent encoding z for the input x, the encoder learns the parameters of a posterior distribution $q(z|x)$. In particular, this distribution is usually Gaussian and the encoder learns its mean and standard deviation. The actual encoding z will be a random sample taken from this distribution. The encoding z is then fed to the decoder to reconstruct the input.

Secondly, the loss function used to train the VAE usually comprises two terms. One is the reconstruction loss between the data input to the encoder and the data output by the decoder, and the other is a distance measure between the approximate posterior $q(z|x)$ and a prior distribution $p(z)$, which is referred to as the "latent loss". This latent loss may be the Kullback-Leibler divergence between the two distributions. One choice for $p(z)$ is a standard Gaussian distribution with mean 0 and standard deviation 1. While the reconstruction term tries to make the output as similar as possible to the input, the latent loss term regularizes the encodings to mostly remain in and around the hyper sphere corresponding to the prior distribution which is centered at the origin. As a result of this regularization term, the decoder learns how to map encodings that are in this area of the space into meaningful outputs in the visible space. Hence, once the model has been trained, any latent code sampled from the prior distribution should map to a realistic data point by the decoder neural network.

Figure 1:
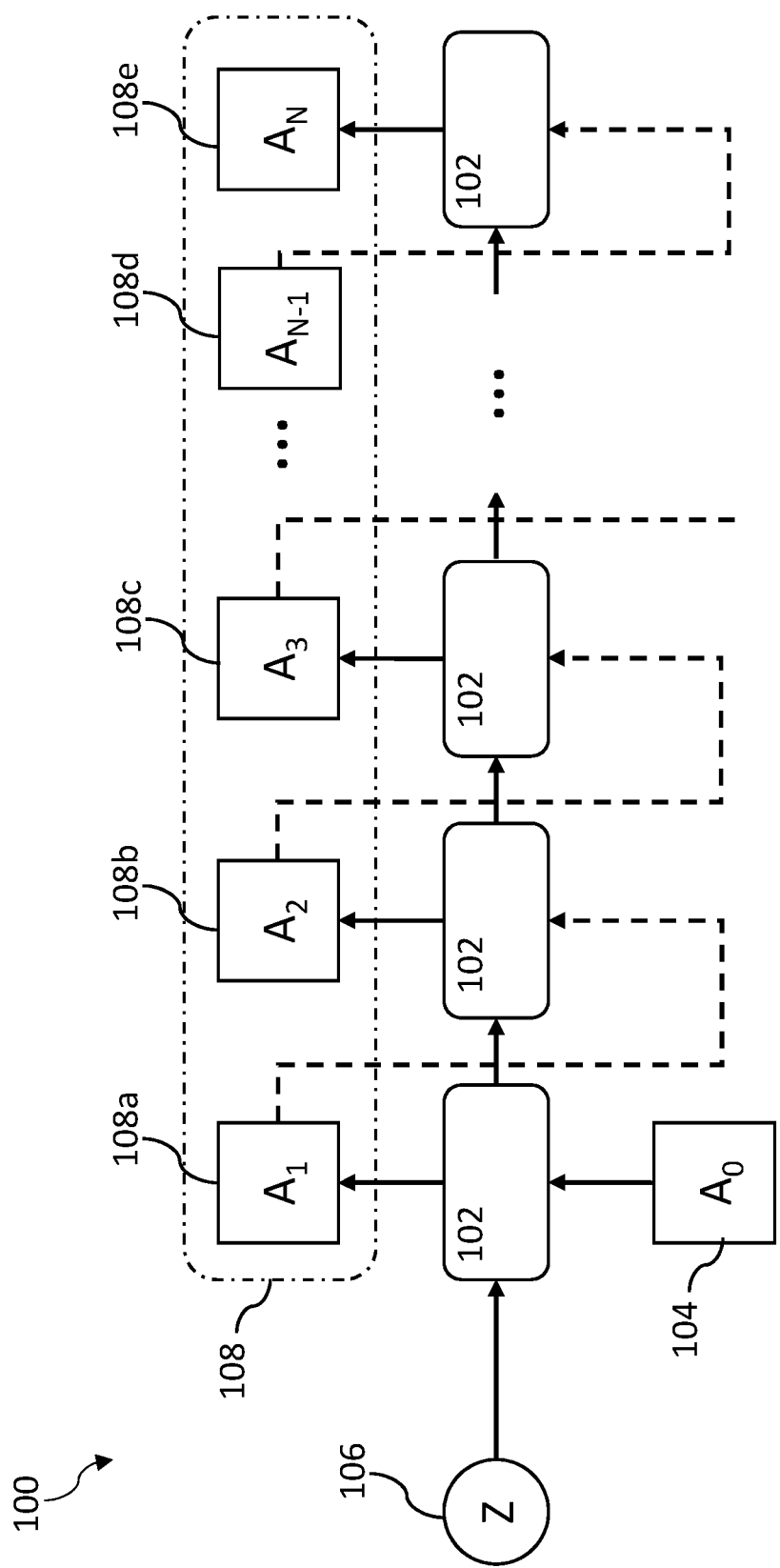
FIG. 1 shows a schematic overview of an example method for generating an animation using an RNN.

FIG. 1 shows an overview of an example method 100 for generating animation data using an RNN. The method processes a sequence of input animation frames over a plurality of timesteps/iterations using an RNN 102 to generate a sequence of output animation frames 108. At each iteration after an initial iteration, the input animation frame to the RNN 102 comprises the output animation frame 108a-e of the previous iteration.

At a first iteration, input data comprising an initial frame of animation data 104, $A_0$, is input into a recurrent neural network 102 (RNN). The RNN 102 is initialized with an internal state sampled from a learned distribution 106, z. The RNN 102 processes the initial frame of animation data 104 to generate a first generated frame 108a, $A_1$, in a sequence of generated frames of animation data 108. The internal/hidden state of the RNN 102 is updated based on the processing.

At a second iteration, input data comprising the first generated frame 108a is input to the RNN 102, and processed based on the current internal state of the RNN 102 to generate a second generated frame 108b, $A_2$, of animation data in the sequence of generated frames of animation data 108. The internal state of the RNN 102 is updated based on the processing.

This process is repeated at each of a plurality of iterations, N; at the i-th iteration, input data comprising the output of the (i−1)-th iteration is input into the RNN 102 and processed based on the current internal state of the RNN 102 to generate the i-th animation frame in the sequence of animation frames 108. At each iteration, the internal/hidden state of the RNN 102 is updated based on the processing for that iteration.

The generated animation data 108 comprises a plurality of frames of animation data in a sequence, each frame comprising one or more objects arranged in respective object poses. The object poses may be defined by a set of keypoint data, e.g. locations and orientations of keypoints of the object. The keypoints may comprise, for example, the joints of a human character.

The RNN 102 may comprise one or more Long Short-Term Memory (LSTM) networks, comprising one or more LSTM units. Each LSTM unit may comprise a cell, an input gate, an output gate and a forget gate. The LSTM may be a unidirectional LSTM. In some embodiments, the LSTM is a single layer, unidirectional LSTM. Alternatively or additionally, other types of RNN may be used.

In some embodiments, the sampled initial state 106 of the RNN 102 may be jointly input to the RNN with the input animation frame at each time step. For example, the initial state 106 of the RNN 102 may be concatenated with the input animation frame at each time step.

In some embodiments, the RNN is configured to interpolate an animation from a known initial frame, $A_0$, to a known final frame, $A_{N+1}$, i.e. to perform inbetweening. The input data to the RNN at each iteration may include additional data to allow this interpolation. For example, the input data at each iteration may comprise a copy of the known final frame in addition to the previously generated frame, effectively providing a target for the animation generation. In such embodiments, the input data at each iteration may further comprise an indication of how close in time the previously generated frame/the frame being generated is to the final frame. For example, the indication may be a number of animation frames between the current frame being generated and the final frame, or the time between the current frame being generated and the final frame.

Such "inbetweening" embodiments may be used in computer games to generate in-game animations between an initial (or current) pose of an in-game character and a target pose of the in-game character. For example, the initial animation frame may comprise an in-game character in a first pose at a first in-game location, e.g. in a standing pose. The target animation frame may comprise an in-game character in a second pose, e.g. a jumping pose, at a second in-game location. The RNN may generate animation frames showing the in-game character at a sequences of poses linking the first pose to the second pose, e.g. running to the second location and then jumping.

Figure 2:
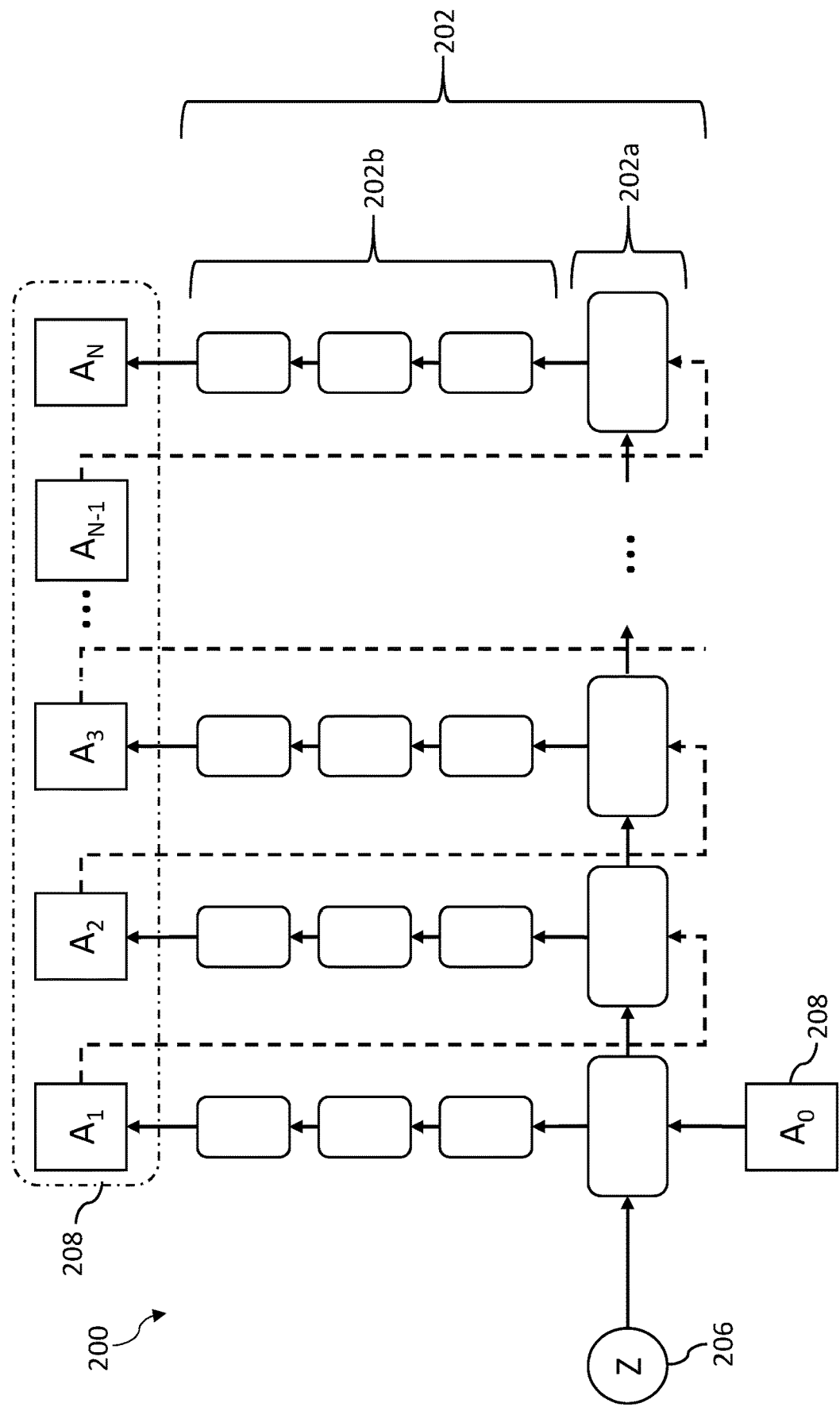
FIG. 2 shows a schematic overview of a further example method for generating animation using an RNN

FIG. 2 shows an overview of a further example method 200 for generating animation data using an RNN. The method 200 proceeds as in the method described in FIG. 1; a sequence of input animation frames is processed over a plurality of iterations using an RNN 202 to generate a sequence of output animation frames 208. At each iteration after an initial iteration, the input animation frame to the RNN 202 comprises the output animation frame of the previous iteration.

In the embodiment shown in FIG. 2, the RNN 202 comprises a first RNN 102a and a second RNN 202b. The first RNN 202a takes as input an animation frame and processes it based on the current internal state of the first RNN 202a to generate data representing a plurality of keypoints in the animation, e.g. joint positions and orientations of a character in the animation. The internal state of the first RNN is updated at each iteration based on this processing. The initial internal state 206 of the first and/or second RNN, z, is sampled from a learned distribution. The initial input to the first RNN comprises a known initial animation frame 208.

The data representing the keypoints output by the first RNN 202a is sequentially input into the second RNN 202b, which processes it to generate an output animation frame in the sequence of generated frames of animation data 208. For example, a subset of the set of keypoints output by the first RNN 202a may be input into the second RNN 202b at each time step, each subset of keypoint data relating to a single keypoint or a plurality of related keypoints. The second RNN processes the keypoint data output by the first RNN to refine it based on a frame-level understanding of the animation.

The first RNN 202a may be a unidirectional LSTM. The second RNN may be a unidirectional or bi-directional LSTM.

Figure 3:
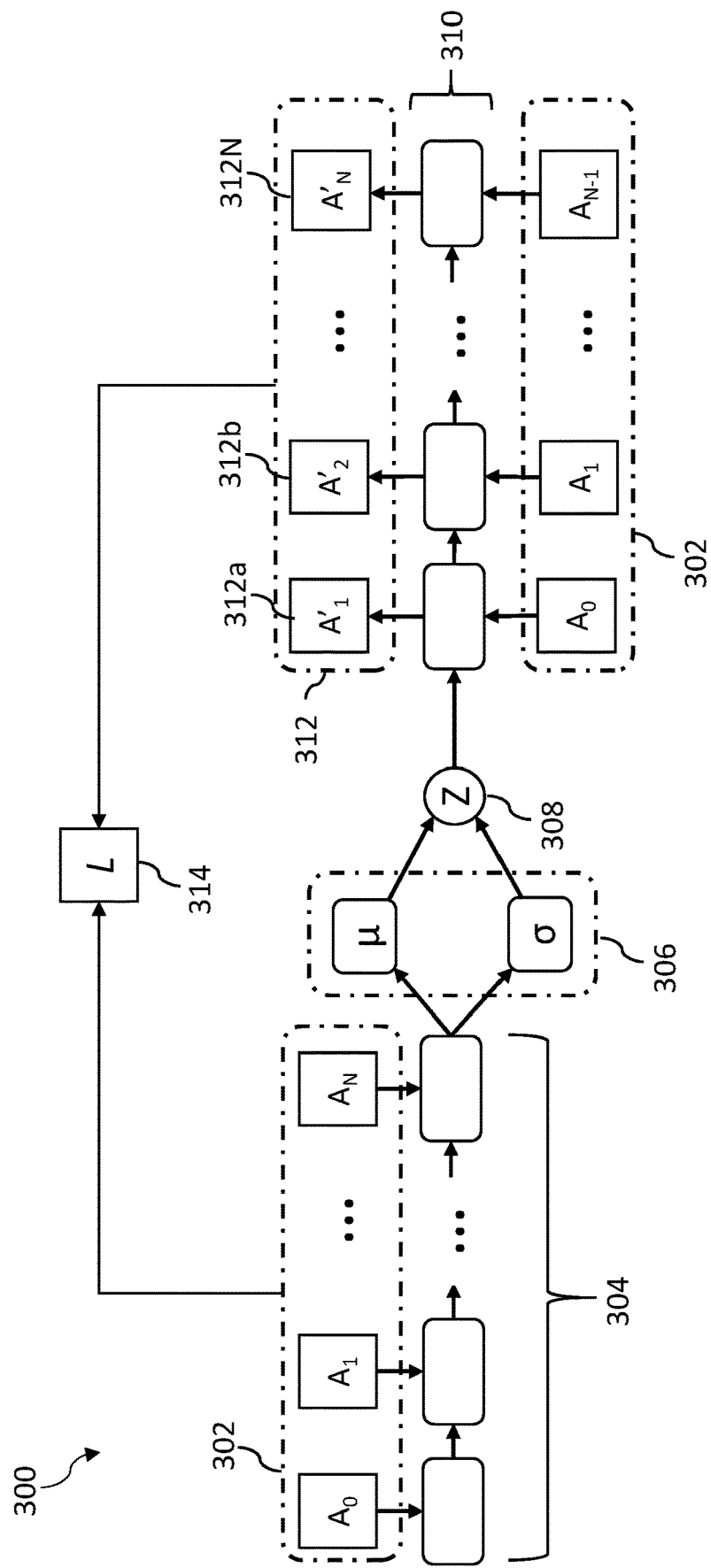
FIG. 3 shows a schematic overview of an example method for training an RNN to generate an animation.

FIG. 3 show an overview of an example method 300 for training a decoder RNN to generate animation data. Once trained, the decoder RNN may be used as the RNN in any of the methods described in relation to FIG. 1 and FIG. 2.

The training is based on a Variational Autoencoder (VAE) approach. Frames of a ground truth animation 302 from a training set of ground truth animations are sequentially input into an encoder RNN 304. The encoder RNN 304 processes each input frame based on a current value of its parameters and the current value of the internal/hidden state of the encoder RNN 304 to update an internal/hidden state of the encoder RNN.

The training set comprises a plurality of ground truth animations 302. Each ground truth animation 302 comprises a plurality of frames of animation data in a sequence. The ground truth animation data may have been hand crafted by an animator, with or without the assistance of a computer.

The encoder RNN 304 may comprise a LSTM layer. The LSTM layer may be a unidirectional LSTM layer or a bi-directional LSTM layer. The encoder RNN may further comprise a fully connected layer. The fully connected layer may follow the LSTM layer, e.g. be the last layer of the encoder RNN 304.

Once all input frames in the ground truth animation 302 have been processed, the encoder RNN 304 outputs one or more parameters 306 of a distribution 308 representing the ground truth animation. The output parameters 306 are based on the internal/hidden state of the encoder RNN 304 of the once the final animation frame in the ground truth animation has been processed. The parameters 306 may, for example, comprise the mean, σ, and standard deviation, μ, of the distribution 308.

A latent vector/state, z, is sampled from the distribution 308, and used to initialize a decoder RNN 310. The latent vector/state may be used to set the initial state of the decoder RNN 310 and/or may be concatenated with the input data to the decoder RNN 310. The decoder RNN may have any of the RNN structures described in relation to FIGS. 1 and 2.

The decoder RNN 310 iteratively processes the ground truth animation 302 to generate a candidate output animation 312. At each iteration, input data comprising a ground truth frame of animation, $A_{n-1}$, is input into the decoder RNN 310 and used to generate a candidate output frame, $A'_n$, 312a-N. The ground truth frame of animation 312a-N corresponds to the frame of animation preceding the candidate animation frame being generated, i.e. at iteration/time step n, ground truth animation frame (n−1) is input into the decoder RNN 310. By contrast, once trained, the input data to the decoder RNN 310 at inference time for each time step comprises the output frame of the previous iteration/time step.

At each iteration/time step, the decoder RNN 310 processes the input data based on the current values of the parameters of the decoder RNN 310 and the current internal/hidden state of the decoder RNN 310. The internal/hidden state of the decoder RNN 310 is updated at each iteration/time step based on the processing.

In some embodiments, the input data at each iteration may further comprise a target frame of animation, i.e. the last frame of animation in a sequence, in order to train the decoder RNN for inbetweening. The input data may further comprise an indication of the temporal distance between the current frame being generated and the target frame, e.g. a distance in frames or a distance in time.

The candidate animation 312 generated by the decoder RNN 310 is compared to corresponding ground truth animation 302 from which it was generated using a loss/objective function 314, L. Based on the comparison, parameters of the encoder RNN 304 and/or decoder RNN 310 are updated. An optimisation routine, such as stochastic gradient descent, may be applied to the loss/objective function 314 to determine the updates to the encoder RNN 304 and/or decoder RNN 310. In some embodiments, updates to the encoder and/or decoder parameters are made after a batch or mini-batch of ground truth data comprising a plurality of ground truth animations has been processed by the RNN.

The loss/objective function 314 may comprise a first loss comparing the ground truth animation frames to their respective generated animation frames 312a-N (also referred to as a "reconstruction loss") and a second loss function comparing the approximate posterior $q(z|x)$ and a prior distribution $p(z)$ (also referred to as a "latent loss"). The first loss may, for example, be based on a difference between the ground truth animation and the corresponding candidate animation, e.g. a sum of L2 or L1 losses between the ground truth animation frames and their corresponding candidate animation frames. The second loss may be a comparison between the approximate posterior $q(z|x)$ and a prior distribution $p(z)$, e.g. a Kullback-Leibler divergence.

The training method 300 may be iterated until a threshold condition is satisfied. The threshold condition may be a threshold number of training epochs and/or a threshold performance on a training dataset comprising a plurality of ground truth animations that may be distinct from the animations in the training dataset.

Figure 4:
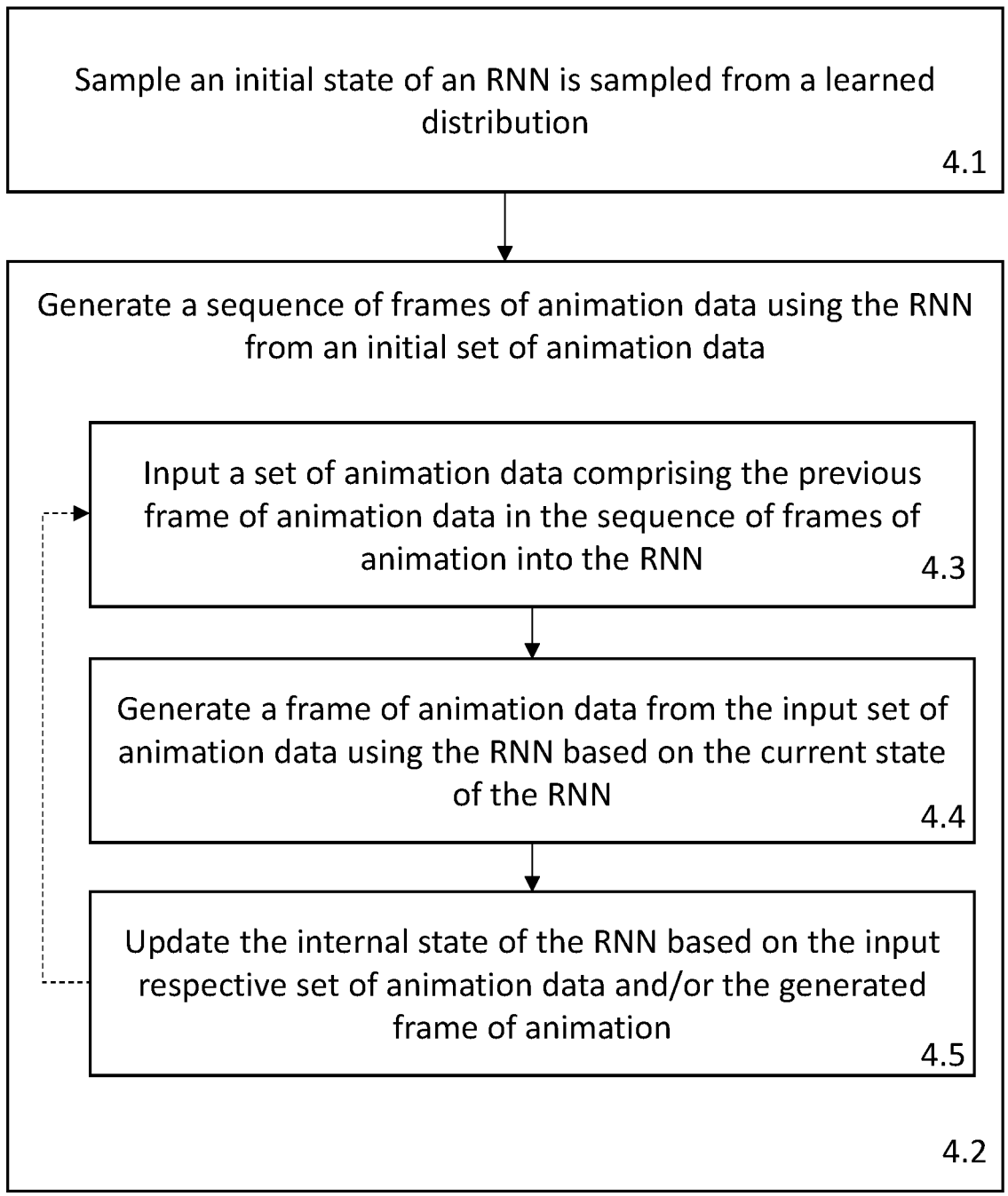
FIG. 4 shows a flow diagram of an example method of generating an animation using an RNN.

FIG. 4 shows a flow diagram of an example method for generating animation data using an RNN. The method may be performed by one or more computers operating in one or more locations.

At operation 4.1, an initial state of the RNN is sampled from a learned distribution. The distribution may have been learned using a Variational Autoencoder technique, for example any of the techniques described in relation to FIG. 3 or 5. The samples initial state of the RNN may be used to set the initial state of the RNN before any input data is received. Alternatively or additionally, the initial state of the RNN may be concatenated with the inputs to the RNN.

At operation 4.2, a sequence of frames of animation data are generated using the RNN from an initial set of animation data. The initial set of animation data input into the RNN comprises a known initial frame of animation, $A_0$. To generate the sequence of frames of animation data, operations 4.3 to 4.5 are iterated until the sequence of animation frames has been generated. Each iteration produces a frame of animation in the sequence of frames of animation.

At operation 4.3, a set of animation data comprising the previous frame of animation data in the sequence of frames of animation is input into the RNN. For the first iteration, the previous frame of animation data is the known initial frame of animation, $A_0$; at subsequent iterations, the previous frame of animation data is the frame of animation output by the previous iteration, $A_{n-1}$ (i.e. the frame of animation generated at the previous timestep).

In some embodiments, the set of animation data input into the RNN may further comprise a target frame of animation corresponding to a final frame of animation in the sequence of frames of animation, $A_N$, i.e. a known final frame of animation. The target frame of animation may comprise an in-game character in a target pose.

The set of animation data input into the RNN may further comprise an indication of a temporal distance between the input previous frame of animation and the target frame of animation. The indication may, for example, comprise a number of frames of animation between the previous frame of animation and the known final frame of animation (e.g. N−(n−1), where N is the number of frames being generated in the animation sequence and n is the current iteration/time step). Alternatively, the indication may be a time between the previous frame of animation and the known final frame of animation or the like.

Alternatively, the set of animation data may additionally comprise an interpolated latent variable, z, that interpolates between a value of the latent variable associated with the initial frame of animation and a value of the latent variable associated with the final frame of animation.

At operation 4.4, a frame of animation data is generated from the input set of animation data by the RNN based on the current state of the RNN and the values of parameters of the RNN. The frame of animation corresponds to the next frame of animation in the sequence, i.e. if the previous frame of animation data is the (n−1)-th frame in the sequence, the generated frame is the n-th frame in the sequence.

In some embodiments, the RNN comprises a unidirectional LSTM layer followed by a fully connected layer. Alternatively, the RNN may comprise a first RNN and a second RNN. The first RNN is configured to take the input set of animation data as input and generate an output comprising data representing a plurality of keypoints of the animation frame being generated. The keypoints may, for example, be joints of a character present in the animation. The first RNN may comprise a unidirectional LSTM layer. The second RNN takes as input the data representing the plurality of keypoints and processes it to generate the animation frame for the iteration. The keypoint data is sequentially input into the second RNN, with the internal state of the second RNN updated when each input is processed. The second RNN may comprise a unidirectional LSTM layer.

At operation 4.5, the internal/hidden state of the RNN is updated based on the input respective set of animation data and/or the generated frame of animation. The method then returns to operation 4.3, unless the final frame in the sequence has been reached.

Figure 5:
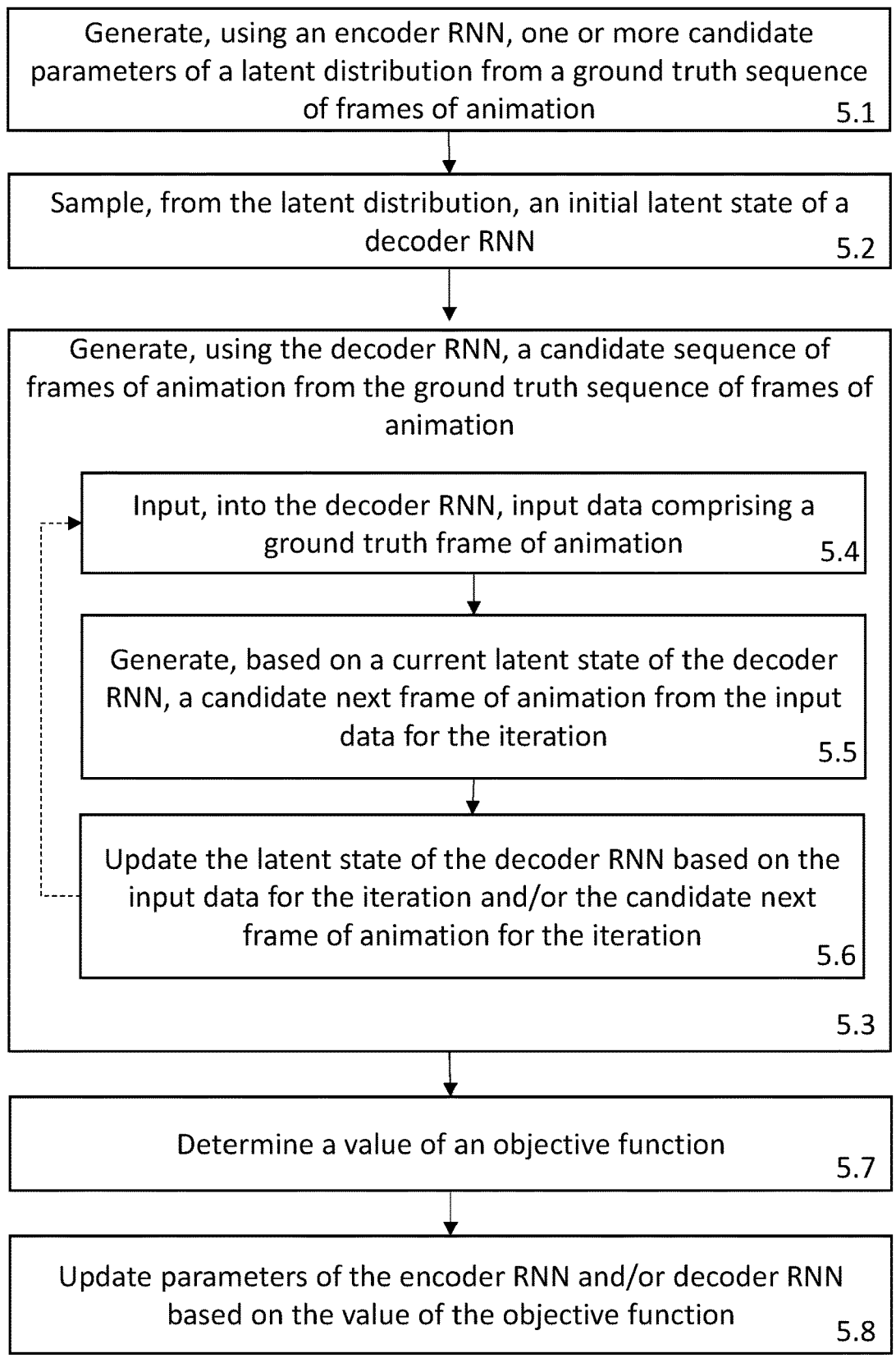
FIG. 5 shows a flow diagram of an example method for training an RNN to generate an animation.

FIG. 5 shows a flow diagram of an example method for training an RNN to generating animation data. The method may be performed by one or more computers operating in one or more locations. The decoder RNN trained by the method may be used as an RNN for generation animations, as described in relation to FIGS. 1, 2 and 4.

At operation 5.1, an encoder RNN is used to generate parameters of a latent distribution from a ground truth sequence of frames of animation. Each ground truth sequence of frames of animation is taken from a training dataset comprising a plurality of sequences of animation data.

The ground truth sequence of frames of animation are sequentially input into the encoder RNN, one at leach encoder time step/iteration. At each encoder iteration/timestep, an internal state of the encoder RNN is updated based on the input ground truth frame, the current state of the encoder RNN and current values of parameters of the encoder RNN (e.g. weights and biases of the RNN). When the encoder time step/iteration is reached (i.e. the final ground truth frame is processed), the encoder RNN may output parameters of the latent distribution based at least in part on the final value of its internal state. The distribution parameters may comprise a mean and/or a standard deviation of a distribution, e.g. a Gaussian distribution.

The encoder RNN may comprise one or more LSTM layers, e.g. in the form of a unidirectional LSTM. The encoder RNN may further comprise one or more fully connected layers. The one or more fully connected layers may be arranged after the one or more LSTM layers.

At operation 5.2, an initial state of a decoder RNN is sampled from the distribution. The sampling may be based on the parameters output by the encoder RNN.

At operation 5.3, a candidate sequence of frames of animation is generated from the ground truth sequence of frames of animation using the decoder RNN by repeatedly performing operations 5.3 to 5.5 until an output sequence of animation frames of a desired length is generated.

The decoder RNN may comprise one or more a unidirectional long short-term memory layers. In some embodiments, the decoder RNN comprises a first RNN (the "animation RNN") configured to data representing of a respective set of key points for each input frame from said input frame, and a second RNN (the "frame RNN") configured to generate the respective candidate next frame of animation data from the data representative of the set of key points.

At operation 5.4, input data comprising a ground truth frame of animation is input into the decoder RNN. The input data may, in some embodiments, further comprise the sampled initial state of a decoder. The input data may, in some embodiments, comprise a target animation frame corresponding to the last animation frame in the sequence of animation frames being generated and an indication of the temporal proximity of the target frame to the current candidate frame being generated.

At operation 5.5, the decoder RNN generates, based on a current hidden state of the decoder RNN, a candidate next frame of animation from the input data for the iteration. Generating the candidate next frame of animation from the input data for the iteration may comprise generating, using a first RNN of the decoder RNN, data representative of a respective set of key points for the input frame. Generating the candidate next frame of animation from the input data for the iteration may further comprise generating, using a second RNN, the respective candidate next frame of animation data from the data representative of the set of key points.

At operation 5.5, the hidden state of the decoder RNN is updated based on the input data for the iteration and/or the candidate next frame of animation for the iteration.

Once a full sequence of animation frames has been generated, the method may proceed to operation 5.7. Alternatively, a further one or more candidate sequences of frames of animation may be generated from respective ground truth animation frames by repeating operations 5.1 to 5.6 before proceeding to operation 5.7, i.e. a batch or mini-batch of training data may be processed.

At operation 5.7, the value of an objective/loss function is determined. The objective function comprises (i) a comparison of the candidate sequence of frames of animation to the ground truth sequence of frames of animation (e.g. a pixel wise L1 or L2 loss); and (ii) a latent loss measuring a difference between an approximate posterior and a prior distribution (e.g. a Kullback-Leibler divergence).

At operation 5.8, parameters of the encoder RNN and/or decoder RNN based on the value of the objective function. An optimization routine may be applied to the objective function to determine the updates. The goal of the optimization routine may be to minimize the objective function. Examples of such optimization routines include, but are not limited to, stochastic gradient descent.

Operations 5.1 to 5.8 may be iterated until a threshold condition is satisfied. The threshold condition may be a threshold number of training epochs and/or a threshold performance on a test dataset.

Figure 6:
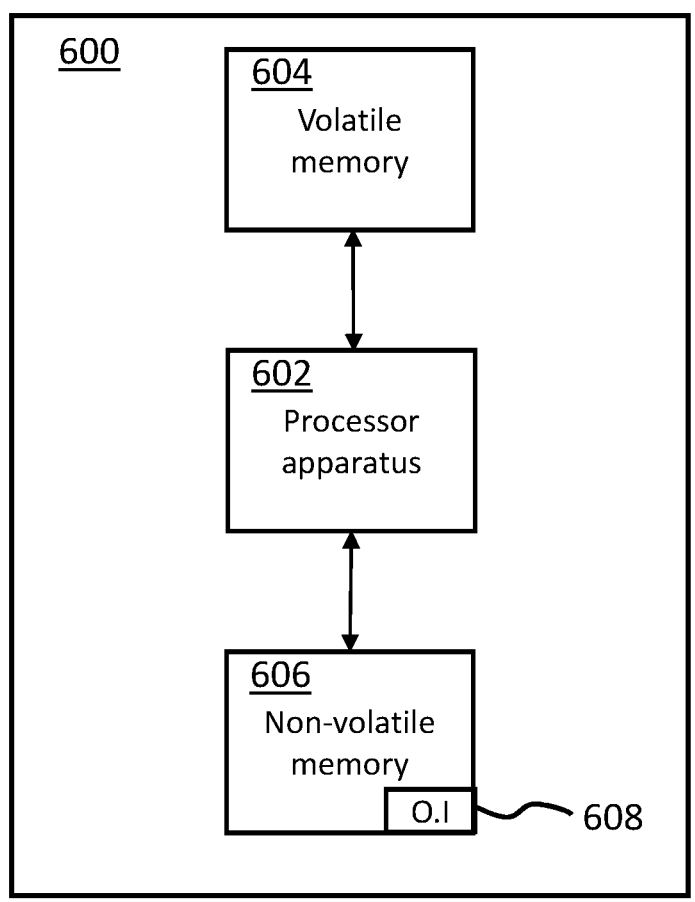
FIG. 6 shows a schematic overview of a computing system/apparatus.

FIG. 6 shows a schematic example of a system/apparatus 600 for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 600 comprises one or more processors 602. The one or more processors control operation of other components of the system/apparatus 600. The one or more processors 602 may, for example, comprise a general-purpose processor. The one or more processors 602 may be a single core device or a multiple core device. The one or more processors 602 may comprise a Central Processing Unit (CPU) or a graphical processing unit (GPU). Alternatively, the one or more processors 602 may comprise specialized processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 608 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to store temporarily data generated during execution of said operating instructions 608.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and are believed to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer implemented method comprising:
sampling an initial hidden state of a recurrent neural network (RNN) from a distribution;
generating, using the RNN, a sequence of frames of animation from an initial state of the RNN and an initial set of animation data comprising a known initial frame of animation and a known final frame of animation, the generating comprising, for each generated frame of animation in the sequence of frames of animation:
inputting, into the RNN, a respective set of animation data comprising a previous frame of animation data in the sequence of frames of animation, the known final frame of animation and an indication of a temporal distance between the generated frame and the known final frame of animation in the sequence of animation frames;
generating, using the RNN and based on a current hidden state of the RNN, the frame of animation data; and
updating the current hidden state of the RNN based on the input respective set of animation data,
wherein the generated sequence of frames of animation runs from the known initial frame of animation to the known final frame of animation.

2. The method of claim 1, wherein generating, using the RNN and based on a current state of the RNN, the frame of animation data comprises:
generating, using a first RNN, data representing a set of key points for the animation frame from the input respective set of animation data; and
generating, using a second RNN, the frame of animation data from the set of key points.

3. The method of claim 2, wherein the data representing the set of key points for the animation comprises locations and/or orientations of a plurality of joints of a character in the sequence of frames of animation.

4. The method of claim 1, wherein the temporal distance between the generated frame and the known final frame of animation comprises a number of frames between the generated frame and the known final frame of animation in the sequence of animation frames.

5. The method of claim 1, wherein the RNN comprises a unidirectional long short-term memory layer.

6. The method of claim 1, wherein the distribution is a learned distribution that has been obtained by jointly training the RNN with an encoder RNN using a variational autoencoder approach.

7. A non-transitory computer readable medium comprising computer readable instructions that, when executed by a system comprising one or more processors, causes the system to perform a method comprising:
sampling an initial state of a recurrent neural network (RNN) from a distribution;
generating, using the RNN, a sequence of frames of animation from the initial state of the RNN and an initial set of animation data comprising a known initial frame of animation and a known final frame of animation, the generating comprising, for each generated frame of animation in the sequence of frames of animation:
inputting, into the RNN, a respective set of animation data comprising a previous frame of animation data in the sequence of frames of animation, the known final frame of animation and an indication of a temporal distance between the generated frame and the known final frame of animation in the sequence of animation frames;
generating, using the RNN and based on a current state of the RNN, the frame of animation data; and
updating the state of the RNN based on the input respective set of animation data,
wherein the generated sequence of frames of animation runs from the known initial frame of animation to the known final frame of animation.

8. The non-transitory computer readable medium of claim 7, wherein generating, using the RNN and based on a current state of the RNN, the frame of animation data comprises:

generating, using a first RNN, data representing a set of key points for the animation frame from the input respective set of animation data; and
generating, using a second RNN, the frame of animation data from the set of key points.

9. The non-transitory computer readable medium of claim 8, wherein the data representing the set of key points for the animation comprises locations and/or orientations of a plurality of joints of a character in the sequence of frames of animation.

10. The non-transitory computer readable medium of claim 7, wherein the temporal distance between the generated frame and the known final frame of animation comprises a number of frames between the generated frame and the known final frame of animation in the sequence of animation frames.

11. The non-transitory computer readable medium of claim 7, wherein the RNN comprises a unidirectional long short-term memory layer.

12. The non-transitory computer readable medium of claim 7, wherein the distribution is a learned distribution obtained by jointly training the RNN with an encoder RNN using a variational autoencoder approach.

13. A computer implemented method comprising:
    generating, using an encoder recurrent neural network (RNN), one or more candidate parameters of a latent distribution from a ground truth sequence of frames of animation;
    sampling, from the latent distribution, an initial hidden state of a decoder RNN;
    generating, using the decoder RNN, a candidate sequence of frames of animation from the ground truth sequence of frames of animation, comprising, at each of a plurality of iterations:
        inputting, into the decoder RNN, input data comprising a ground truth frame of animation;
        generating, based on a current hidden state of the decoder RNN, a candidate next frame of animation from the input data for the iteration; and
        updating the current hidden state of the decoder RNN based on the input data for the iteration and/or the candidate next frame of animation for the iteration;
    determining a value of an objective function, the objective function comprising: (i) a comparison of the candidate sequence of frames of animation to the ground truth sequence of frames of animation; and (ii) a latent loss measuring a difference between an approximate posterior and a prior distribution;
    updating parameters of the encoder RNN and/or decoder RNN based on the value of the objective function.

14. The method of claim 13, wherein generating the candidate next frame of animation comprises:
    generating, using a first RNN of the decoder RNN, data representative of a respective set of key points for the input frame; and
    generating, using a second RNN, the respective candidate next frame of animation data from the data representative of the set of key points.

15. The method of claim 13, wherein the encoder RNN and/or decoder RNN comprises a unidirectional long short-term memory layer.

16. The method of claim 13, wherein the latent distribution comprises a Gaussian distribution and wherein the one or more candidate parameters of the latent distribution comprise a mean and a standard deviation.

17. The method of claim 13, wherein the latent loss comprises a Kullback-Leibler divergence.

18. The method of claim 13, wherein the updating parameters of the encoder RNN and/or decoder RNN based on the value of the objective function comprises applying stochastic gradient descent to the objective function.

* * * * *